Jan. 5, 1965  W. P. WHITE  3,164,528
NUCLEAR REACTOR FUEL ELEMENTS
Filed Sept. 2, 1960

INVENTOR
William Paul White
BY
Lawson and Taylor ium Atomic Energy Authority,
United States Patent Office 3,164,528
Patented Jan. 5, 1965

3,164,528
NUCLEAR REACTOR FUEL ELEMENTS
William Paul White, Saughall, near Chester, England, assignor to United Kingdom Atomic Energy Authority, London, England
Filed Sept. 2, 1960, Ser. No. 53,826
Claims priority, application Great Britain, Jan. 14, 1960, 1,387/60
6 Claims. (Cl. 176—67)

This invention relates to nuclear reactor fuel elements of the kind comprising a fuel member enclosed in a protective sheath.

A small leak in the sheath of a fuel element of the kind described can give rise, in a pressurised gas cooled reactor system, to inflow of coolant followed by reaction between coolant and the fuel member. The reaction products formed between the fuel member and the protective sheath can then cause localised swelling and breach of the protective sheath with escape of the reaction products into the coolant with consequent serious contamination of the reactor.

It is thus an object of the invention to provide a nuclear reactor fuel element of the kind described with means for detecting the onset of localised swelling of the sheath and according to the invention, such means comprises a hollow frangible body attached to the outside of the sheath so that localised swelling of the sheath imparts a bending movement to the body, and a detectable substance is contained within the hollow body and is released on fracture of the body.

The frangible body can be in the form of a tube closed at both ends and positioned longitudinally along any part or all of the length of the protective sheath of the fuel element so that local asymmetric swelling of the sheath will impart a bending moment to the tube and the tube will fracture when the growth of the fuel element exceeds a limit depending on the physical characteristics of the tube.

Where, as is usually the case, the protective sheath of the fuel element is externally finned to assist heat transfer, the fins can be cut away to accommodate the tube. Where the fins are radial they can be drilled to accommodate the tube and where the fins run longitudinally along the sheath the tube can be fixed longitudinally between the fins by clips or other suitable means.

If the local diametrical swelling of the fuel element occurs symmetrically around the circumference of the protective sheath one tube is sufficient for detection purposes. However, if the swelling is more localised it is necessary to provide a number of tubes spaced round the periphery of the sheath.

The tube may contain uranium metal in the form of wire or uranium dioxide powder as a source of fission products so that on fracture of the tube the fission products escape into the coolant and can be detected by means external to the reactor core structure to provide indication that the fuel element has experienced a localised swelling in excess of the predetermined limit. Where the means of detection need not involve the release of fission products the tube may be pressure filled with a suitable gas such as nitrous oxide or helium which when released by fracture of the tube can be detected by suitable remote equipment such as an infra red detection unit, a mass spectrometer or a sensitive pressure recording device.

The tube can be made of such brittle materials as silica or alumina which retain their mechanical properties at elevated temperatures. For lower temperature applications some metals can be used particularly if weakened along the length of the tube by means of circumferential grooves. However, a better material for low temperature application is glass if used at a temperature below which it softens.

In an alternative form of the invention a straight tube can be fixed tangentially to the protective sheath of the fuel element by a clip embracing the sheath so that local swelling of the sheath in the region of the clip or at the point of contact of the tube with the sheath will impart a bending moment to the tube and the tube will fracture when the growth of the fuel element exceeds a predetermined limit depending on the physical characteristics of the tube.

Two embodiments of the invention will now be described by way of example with reference to the accompanying drawings in which.

Figure 1:
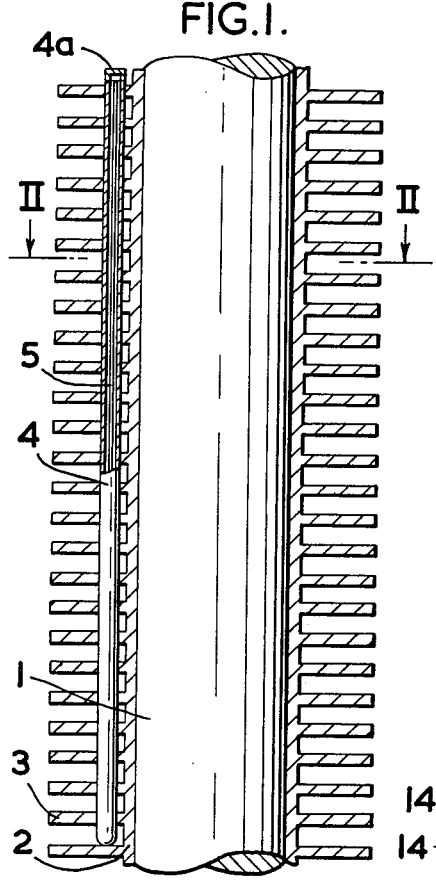
FIG. 1 is a longitudinal section of part of a nuclear reactor fuel element fitted with means for detecting localised swelling of the sheath of the fuel element in accordance with the invention.
Figure 2:
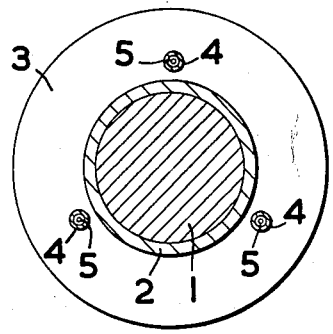
FIG. 2 is a cross section along the line II—II in FIG. 1.

In FIGS. 1 and 2 of the drawings there is shown part of a nuclear reactor fuel element comprising a cylindrical rod 1 of uranium enclosed in a magnesium alloy sheath 2. The sheath 2 has circumferential heat transfer fins 3 which are drilled to accommodate three impermeable alumina tubes 4 which are equispaced around the periphery of the sheath 2 and supported on undrilled fins 3 at the base of the fuel element. The tubes 4 are closed at both ends and each tube contains a length of uranium wire 5. Closure of each tube 4 (which may be made with one blind end) is effected by metalising the open end or ends and brazing on a metal cap 4a.

If a breach occurs in the sheath 2 during operation of the fuel element in a reactor, the ingress of coolant into the sheath 2 causes localised oxidation of the uranium rod 1 with consequent build up of an oxide layer between the rod 1 and the sheath 2. This gradual build up of oxide causes local swelling of the sheath 2 which will impart a bending moment to the tube 4 in the region of the swelling until the tube 4 breaks. On fracture of the tube 4 fission products generated in the uranium wire 5 escape into coolant flowing over the fuel element and these fission products are detected, external to the reactor core structure by means for monitoring the activity of the reactor coolant. Such means are usually embodied in the reactor to detect a faulty fuel element which has failed in such a manner that fission products are released from the fuel rod 1 and escape through the sheath 2 of the fuel element into the coolant and it is arranged that the means for monitoring the activity of the coolant is capable of distinguishing in which fuel element channel the release of activity has occurred.

Hence in the present case on fracture of one of the tubes 4, with release of fission products from the uranium wire 5 contained in the tube 4, the channel occupied by the faulty fuel element can be determined and the fuel element removed from the reactor before the swelling reaches such proportions that the sheath 2 of the fuel element is burst with consequent extensive contamination of the coolant by fission products and uranium oxides, etc. It will be appreciated that if the breach is sufficiently large to allow escape of fission products from the uranium rod 2 these fission products will give immediate indication of the presence of the breach before appreciable oxidation of the uranium rod 2 occurs. However, if the breach is of small cross section and of extended depth the escape of fission products from the uranium rod 2 is so slow that radioactive decay of the fission products occurs before they reach the monitoring equipment. Hence oxide can build up on the rod 2 and it is to meet this contingency that the device of the present invention is provided.

The sensitivity of the arrangement depends on the dimensions of the tube 4. For example an alumina tube of 4 millimetres outside diameter and 6 inches length will fracture with a bow of .015 inch at the centre. Therefore, a tube of these dimensions will detect all swellings of the sheath 2 greater than .015 inch in height. An important feature of this embodiment of the invention is that an overall diametrical growth of the fuel element, such as occurs normally in a nuclear reactor due to radiation growth will not cause fracture of the tubes 4 as these will not be subject to bowing under conditions of overall diametrical growth.

Figure 4:
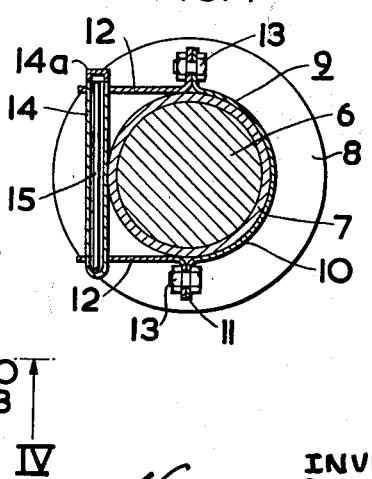
FIG. 4 is a section along the line IV—IV in FIG. 3.
Figure 3:
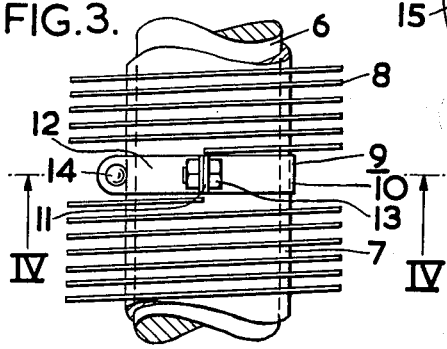
FIG. 3 is a side elevation of part of a nuclear fuel element fitted with another form of means for detecting localised swelling of the sheath of the fuel element in accordance with the invention.

In FIGS. 3 and 4 the nuclear reactor fuel element partly shown comprises a cylindrical rod 6 of uranium enclosed in a magnesium alloy sheath 7. The sheath 7 has circumferential heat transfer fins 8 which are cut away to accommodate a U-shaped clip 9. The clip 9 comprises a semicircular part 10 having end lugs 11. Straight pieces 12 are fixed to the part 10 at the lugs 11 by nuts and bolts 13. The straight pieces 12 of the clip 9 are drilled to accommodate a short alumina tube 14 which is closed at both ends and contains a length of uranium wire 15; tube 14 being closed at one end by cap 14a. Local swelling of the sheath 7 in the region of the clip 9 or the tangential point of contact of the tube 14 with the sheath 7 due to oxide build up will impart a bending moment to the tube 14 until the tube 14 breaks with consequent release of detectable fission products from the uranium wire 15 into coolant flowing over the fuel element. This device only covers a short length of the fuel element, however, so that for complete cover several of the devices must be fitted along the fuel element unless the region of swelling can be predetermined or artificially limited to a region of preferential initial oxidation, for example, by a suitable surface treatment of the fuel rod 6 such as nitriding of the fuel rod except for a narrow band at each end.

This arrangement is sensitive to overall diametral growth of the fuel element but fracture of the tube 14 due to such growth can be avoided by providing a degree of slack or inherent flexibility in the clip 9 which is taken up on general overall growth of the fuel element.

I claim:

1. A nuclear reactor fuel element comprising a nuclear fuel member and a protective sheath enclosing the fuel member in combination with a strain indicator therefor fixed to the outside of the fuel element, the strain indicator comprising a hollow impermeable frangible body separate from the fuel element and attached to the sheath intermediate its ends so that localized swelling of the sheath in the vicinity of said body applies a bending moment to the body to fracture the body, a substance detectable in nuclear reactor coolant for the fuel element being contained within the body, said substance being released from the body into the reactor coolant on fracture of the body due to swelling of the fuel element sheath.

2. A nuclear reactor fuel element comprising a nuclear fuel member and a protective sheath enclosing the fuel member in combination with a strain indicator therefor fixed to the outside of the fuel element, the strain indicator comprising a hollow impermeable frangible body separate from the fuel element and attached to the sheath intermediate its ends so that localized swelling of the sheath in the vicinity of said body applies a bending moment to the body to fracture the body, said body containing a member of fissile material, fission products being released into nuclear reactor coolant for the fuel element from the member of fissile material on fracture of the body due to swelling of the fuel element sheath.

3. An elongate nuclear reactor fuel element comprising a nuclear fuel member and a protective sheath enclosing the fuel member, the element having means for detecting the onset of localised swelling of the sheath and said means comprising a member of fissile material and a frangible tube enclosing the member of fissile material, said tube being closed at both ends and secured in a position adjacent the outside of the sheath and along the length of the fuel element so that local asymmetric swelling of the sheath serves to impart a bending moment to the tube whereby the tube is fractured.

4. A cylindrical nuclear reactor fuel element comprising a nuclear fuel member and a protective sheath enclosing the fuel member, the element having means for detecting the onset of localised swelling of the sheath and said means comprising a member of fissile material, a frangible tube closed at both ends and enclosing the member of fissile material, and means securing the tube in a position tangential to the protective sheath and embracing the sheath so that local swelling of the sheath serves to impart a bending moment to the tube whereby the tube is fractured.

5. A cylindrical nuclear reactor fuel element comprising a nuclear fuel member and a protective sheath enclosing the fuel member, the element having means for detecting the onset of localised swelling of the sheath and said means comprising fissile material, a plurality of frangible tubes closed at their ends and enclosing said fissile material so that fission products confined in the tube after generation by irradiation of the fissile material prior to fracture of the tube are released from the tube on fracture thereof, and means securing said tubes adjacent the outside of the sheath and along the length of the fuel element in positions spaced around the outer periphery of the sheath so that local asymmetric swelling of the sheath serves to strain at least one of the tubes to the point of fracture.

6. A cylindrical nuclear reactor fuel element comprising a nuclear fuel member, a region of preferential initial oxidation on the surface of the fuel member and a protective sheath enclosing the fuel member, the element having means for detecting the onset of swelling of that part of the sheath which encompasses the region of preferential initial oxidation, said means comprising a member of fissile material, a frangible tube closed at both ends and enclosing the member of fissile material, and means securing the tube in a position tangential to the protective sheath, said securing means embracing that part of the sheath which encompasses the region of preferential initial oxidation so that swelling of that part of the sheath serves to impart a bending moment to the tube whereby the tube is fractured and fission products confined in the tube after generation by irradiation of the fissile material prior to fracture of the tube are released from the tube.

References Cited by the Examiner
UNITED STATES PATENTS

| 2,716,229 | 8/55  | Wehrmann et al. |        |
|-----------|-------|-----------------|--------|
| 2,855,355 | 10/58 | Ohlinger et al. | 176—80 |
| 2,873,853 | 2/59  | Burton.         |        |
| 3,037,924 | 6/62  | Creutz          | 176—68 |

OTHER REFERENCES

Atomic World, vol. 10, No. 2, February 1959, pp. 56 and 57.

Nuclear Power, July 1959, pages 77–79.

CARL D. QUARFORTH, *Primary Examiner.*

OSCAR R. VERTIZ, ROGER L. CAMPBELL,
*Examiners.*